108-53.5 OR RE26,618 SR SEARCH ROOM

June 24, 1969 L. F. SKUBIC Re. 26,618

PALLET TIERING FRAME WITH WEDGE JOINT

Original Filed Nov. 15, 1965 Sheet 1 of 4

INVENTOR
LEROY F. SKUBIC,
by: Wolf, Hubbard, Voit and Osann,
ATTYS.

PALLET TIERING FRAME WITH WEDGE JOINT

Original Filed Nov. 15, 1965

INVENTOR
LEROY F. SKUBIC, by: Wolfe, Hubbard, Vott & Orann.
ATTYS

INVENTOR
LEROY F. SKUBIC, by: Wolfe, Hubbard, Voit & Osann,
ATTYS.

PALLET TIERING FRAME WITH WEDGE JOINT

Original Filed Nov. 15, 1965

INVENTOR
LEROY F. SKUBIC,

Wolfe, Hubbard, Voit & Osann,
ATTYS.

United States Patent Office

Re. 26,618
Reissued June 24, 1969

26,618

PALLET TIERING FRAME WITH WEDGE JOINT

Leroy F. Skubic, Long Beach, Ind., assignor to The Paltier Corporation, Michigan City, Ind., a corporation of Illinois Original No. 3,249,072, dated May 3, 1966, Ser. No. 507,731, Nov. 15, 1965. Application for reissue Jan. 23, 1968, Ser. No. 702,139

Int. Cl. B65d *19/38*

U.S. Cl. 108—53 5 Claims

Matter enclosed in heavy brackets [ ] appears in the original patent but forms no part of this reissue specification; matter printed in italics indicates the additions made by reissue.

*ABSTRACT OF THE DISCLOSURE*

*A pallet load supporting tiering frame comprising a pair of support members each having two legs secured together in spaced relation to the opposite ends of a crossbar of tubular construction, each of said crossbars being provided at the central portion thereof with an interlocking member, said interlocking members, when said support members are disposed in intersecting, angular relation, serving to secure the pair of support members together and prevent undesirable movement between said support members.*

The present invention relates generally to load supporting pallet tiering frames, and more particularly to such a frame having an improved interlock device for securing together two main portions of the frame.

It is an object of the invention to provide a pallet tiering frame of the character set forth which can be quickly and easily assembled on a pallet, while providing an unusually rigid engagement between the main parts of the frame. It is a related object to provide a frame of the above kind which is of simple, rigid construction and economical to make and use.

Another object is to provide a pallet tiering frame as characterized above which is capable of preventing undesirable movement between the cross members of the frame without the need for bolts or other conventional fastening devices.

A further object is to provide a pallet tiering frame of the above kind that is compact in design and will not interfere with the support of a second pallet placed upon the tiering frame.

Other objects and advantages of the invention will become apparent from the attached detailed description and upon reference to the drawings, in which.

Figure 7:
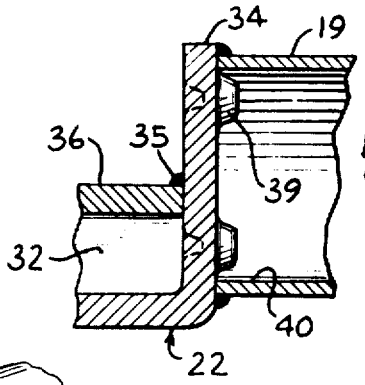
Figure 6:
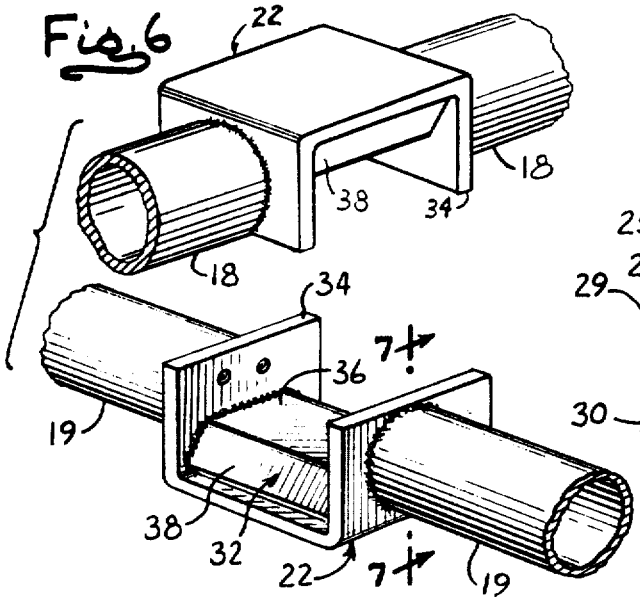
FIG. 6 is an enlarged perspective view of the interlock device in disassembled condition, as shown in FIG. 2.
Figure 8:
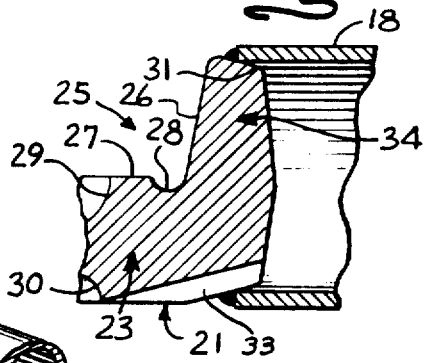
Figure 6A:
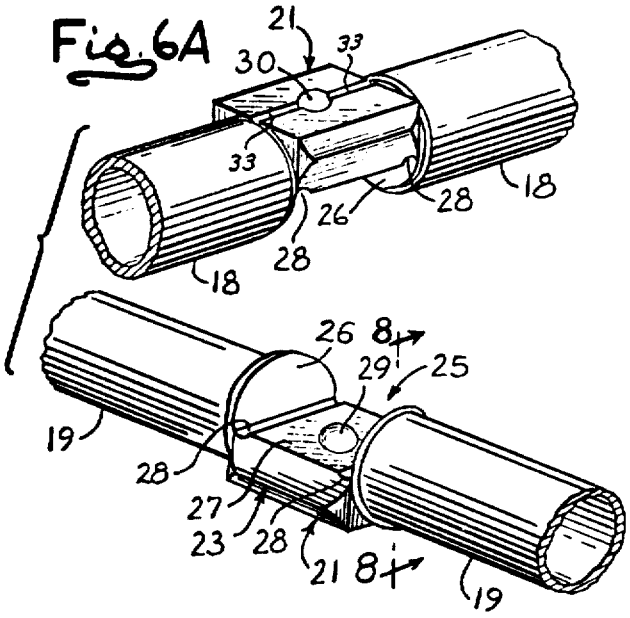
*FIG. 6A is an enlarged perspective view similar to FIG. 6 but showing the interlock device with the other form of mating member;*

FIGS. 7 and 8 are enlarged fragmentary sectional views of the disassembled interlock device shown in *FIGS. 6 and 6A*, [FIG. 6,] taken in the planes of lines 7—7 and 8—8, respectively.

Figure 1:
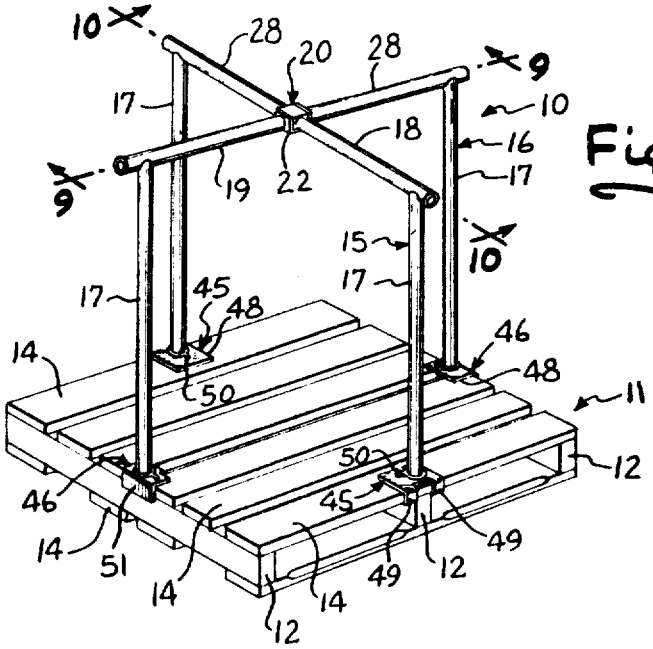
FIGURE 1 is a perspective view of one type of pallet tiering frame embodying the present invention.
Figure 9A:
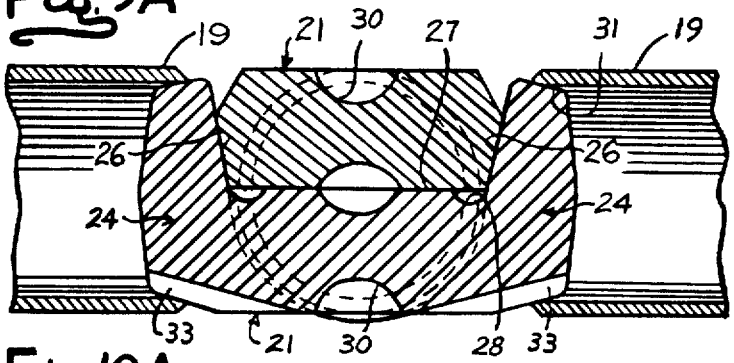
Figure 10A:
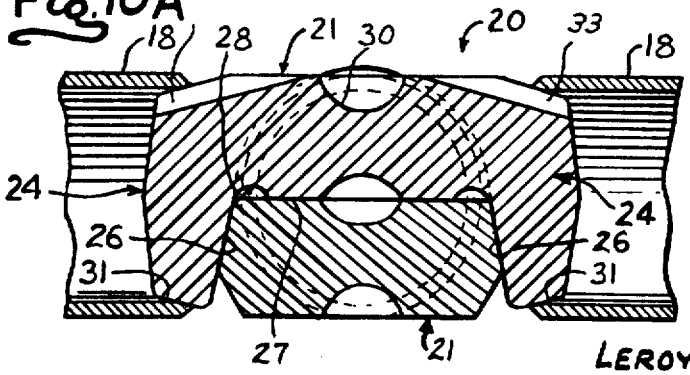
Figure 9:
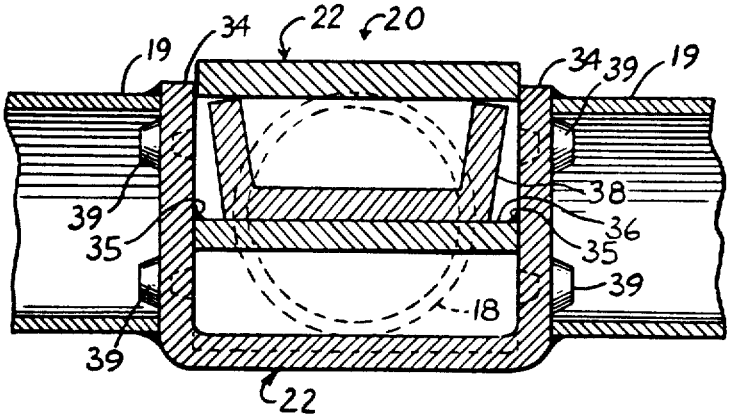
Figure 10:
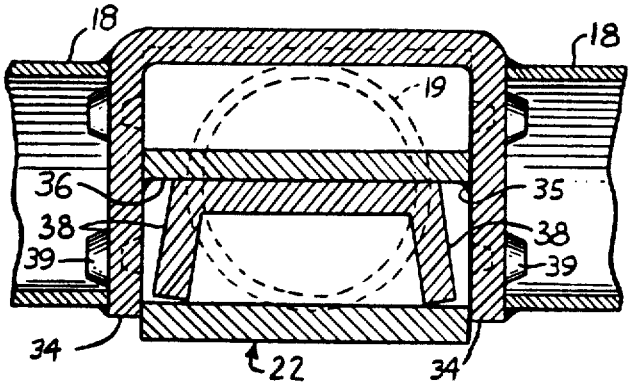

FIGS. 9 and 10 are enlarged fragmentary sectional views of the assembled interlock device shown in FIG. 1, taken in the planes of the lines 9—9 and 10—10, respectively; and

Figure 5:
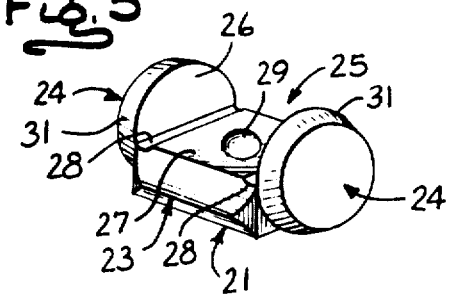
FIG. 5 is a perspective view of [the other] *another form of* mating member of the interlock device of the present invention.

*FIGS. 9A and 10A are enlarged fragmentary sectional views similar to FIGS. 9 and 10 but showing an assembled interlock device with the form of mating member illustrated in FIGS. 5 and 6A;*

Figure 11:
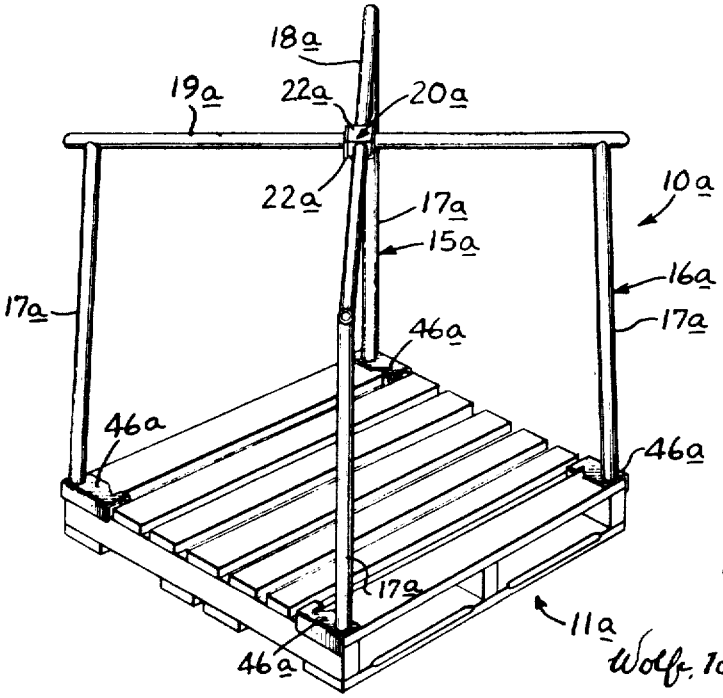

FIG. 11 is a perspective view of another type of pallet tiering frame also embodying the present invention.

While the invention is susceptible of various modifications and alternative forms, certain specific embodiments thereof are shown by way of example in the drawings and will be described herein. It should be understood, however, that it is not intended to limit the invention to the particular forms disclosed, but, on the contrary (the invention is to cover all modifications, equivalents, and alternatives falling within the spirit and scope of the invention as expressed in the appended claims.

Figure 2:
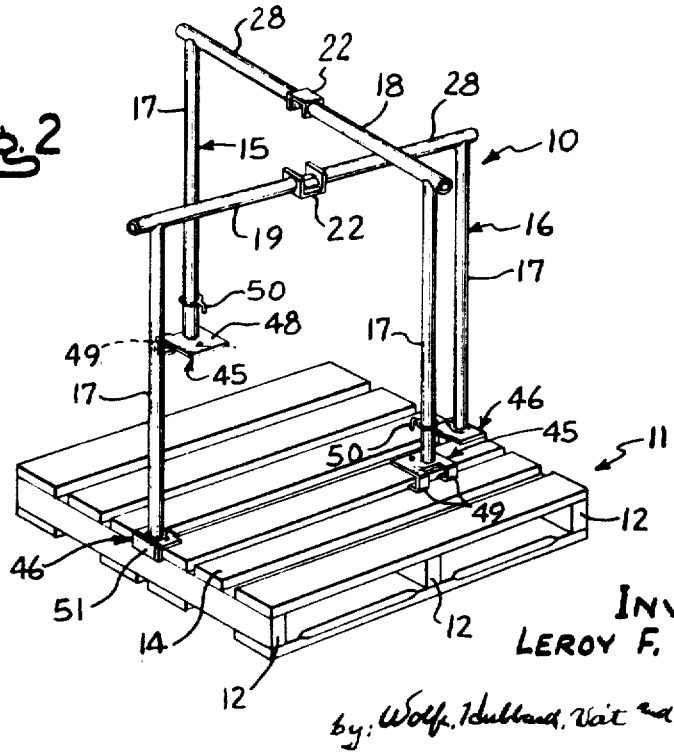
FIG. 2 is a perspective view of the pallet tiering frame shown in FIG. 1 with one U-shaped member of the frame disassembled.

Referring more specifically to FIGS. 1 and 2, the invention is there exemplified in an illustrative tiering frame 10 mounted on a conventional wood pallet 11. In this instance, the pallet 11 includes a plurality of stringer members 12 which are parallel to each other and laterally spaced. Deck boards 14 are fastened transversely to the stringers 12 on either side thereof. In the exemplary pallet, a stringer is positioned at each end of the deck boards with one in the middle, although the number of stringers and deck boards may vary depending upon the loads and usages for which the pallet is designed.

The tiering frame 10 is adapted to be detachably mounted on the pallet 11 in such manner that it can be quickly and easily assembled and disassembled, and when assembled will provide rigid support for one or more additional pallets in tiered relation to the first pallet. The tiering frame 10 comprises a pair of U-shaped support members 15, 16 each having a pair of legs 17 which are secured to the opposed ends of respective crossbars 18, 19. In the illustrated form, the legs and crossbars are made of hollow cylindrical tubing and are secured together by an appropriate means such as welding.

Provision is made for detachably [secured] *securing* the two U-shaped members 15, 16 to each other by means of an interlock device interposed between the crossbars 18, 19 (FIGS. 1, 2, 6, 9 and 10). The device 20 is of sturdy, rigid construction and comprises *opposed pairs of* interlock members 21 [,] *or* 22 [which engage] *the members of each pair engaging* each other complementally so as to resist horizontal sliding movement between the crossbars 18, 19 when the frame 10 is assembled and loaded. The interlock device 20 further permits the two crossbars to lie in the same plane substantially parallel to the pallet so that a second pallet easily may be stacked in tiered relation to the first.

As shown more particularly in FIGS. 5, [6] *6A* and 8, the interlock member [20] *21* is situated centrally of and in the general plane of [the] *each* crossbar 18, *19*, being dimensioned so as not to project above the latter. The member [20] *21* is of bridge-like form, comprising a relatively heavy central portion 23 straddled by a pair of axially spaced bosses or hubs 24. These elements define a transverse trough 25 in the member 20 having tapered sidewall bearing surfaces 26 and a horizontal bearing surface 27 located approximately along the central axis of the member [20] *21* and crossbar 18, *19*. Relief grooves 28 may be provided along each side of the horizontal surface 27 adjacent each surface 26 so as to avoid possible interference with a mating interlock member at the corners of the trough and thereby insure an even bearing between the surfaces of the two members. To save material and help reduce the cost of the member [20] *21*, spherical recesses 29, 30 may be formed at the center of the horizontal bearing surface 27 and at a corresponding position on the opposite side of the member [20] *21*, respectively.

In order to provide a more rigid joinder between the [crossbar] *crossbars* 18, *19* and [the] *their respective* interlock member, the ends of the hubs 24 are tapered as at 31 and adapted to be partially inserted into the hollow cylindrical ends of the crossbar sections, as shown in FIG. 8. The ends of the two halves of the crossbar [18] are welded to the respective hubs 24 along the periphery of their tapered ends 31. In some instances, the ends of the crossbar sections may have a slight inwardly projecting radial dimple as a result of being punch-cut. To accommodate such tube ends, the member 20 may be formed with a pair of longitudinal grooves 33 along its top surface (FIGS. [6] *6A*, 8 and [10] *10A*).

Figure 3:
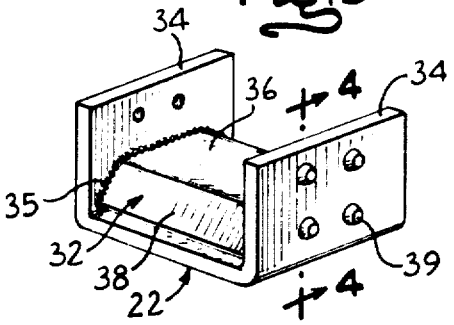
FIG. 3 is a perspective view of one *form of mating* member of the interlock device of the present invention.
Figure 4:
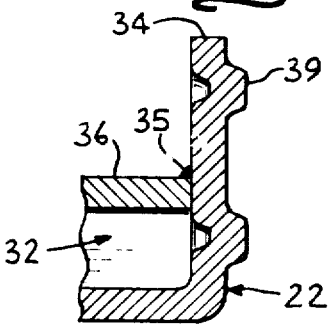
FIG. 4 is an enlarged fragmentary sectional view of the member shown in FIG. 3, taken in the plane of the line 4—4.

Turning now to the [mating] interlock member 22, it will be noted upon reference to FIGS. 3, 6 and [8] *7* that the same is situated centrally of and in the general plane of [the] *each* crossbar *18*, 19, being dimensioned so as not to project appreciably above the latter. The member 22 is formed as a relatively heavy channel disposed transversely of [the] *its associated* crossbar *18*, 19. A longitudinally extending tapered block 32 is mounted so as to extend between the leg portions 34 of the channel member [21] *22*, and in this instance is formed as a heavy sheet metal stamping welded as at 35 to the legs 34. The block 32 is shaped to define thereon a horizontal bearing surface 36 and tapered side bearing surfaces 38 [complementary to the bearing surfaces 26 formed in the trough of the member 21].

The leg portions 34 of the channel-shaped interlock member 22 are formed with a plurality of protruding embossments 39 located in such manner that the inside diameter 40 of the hollow tubing of the [crossbar] *crossbars 18*, 19 fits snugly around the configuration of such embossments. The embossments 39 thus serve to position the two halves of the [crossbar] *crossbars 18*, 19 on the respective legs 34 of the channel member 22. They also provide supplementary support for the welded joint between each leg portion of the channel and its respective section of the crossbar [19].

In actual use, the two U-shaped members 15, 16 comprising the tiering frame 10 are mounted to the pallet 11 in such a manner that their leg portions 17 are perpendicular to the base of the pallet and the two crossbars 18, 19 are perpendicular to each other. [Under these conditions, the tapered block 32 of the channel-shaped interlock member 22 is disposed in mating, bearing relation with the surfaces 26, 27 of trough 25 in the interlock member 21. In this case, the channel-shaped member 22 happens to the bottom member of the joint with the member 21 located on top, although the reverse order also could be used.] The crossbars 18, 19 intersect in rigid engagement in a common plane which is substantially parallel to the base of the pallet 11, thereby providing a secure base upon which a second pallet may be supported. Furthermore, since the interlock members are formed so as to be substantially within the plane of the crossbars, there is no undesirable protuberance caused by the joint which would interfere with the support of the second pallet.

As shown in FIGS. *6*, 9 and 10, *the interlock device 20 comprises a pair of the interlock members 22. In this case, the troughs defined between the channel legs 34 and* the bearing surfaces [26,] [27,] 36, 38 of the interlock members [21,] 22 accurately mate to form a compact joint adapted to resist sliding movement between the two portions of the joint. The tapered surfaces [26,] 38 permit the interlock members [21,] 22 to be readily engaged even though these two members may be slightly misaligned during assembly, the tapered surfaces causing these members to be forced into mating position. The assembly or disassembly of the frame is accomplished quickly and easily, without need for manipulation of bolts or other conventional fastening devices.

*As shown in FIGS. 6A, 9A and 10A, the interlock device 20 comprises a pair of the interlock members 21. In this instance, the troughs 25 and the complementary bearing surfaces 26, 26a, 27 of the members 21 accurately mate to form a compact joint and preclude sliding movement between the two portions of the joint.*

It also should be appreciated that interlock members 21, 22 are of a sturdy and rigid construction adapted to resist bending forces when a load is applied to the tiering frame. The member 21 is a husky member of substantial thickness, while the channel-shaped member 22 is fitted with a wedge-shaped block 32 which acts as a reinforcing element to counteract compressive forces against the legs 34 when the member 22 is located in the bottom position of the joint as shown in the drawings. In addition, since the horizontal bearing surfaces 27, 36 of the interlock members are both approximately on the common axial plane of crossbars, an undue concentration of stresses on either interlock member is prevented.

In the form illustrated in FIGURES 1 and 2, the legs 17 of the U-shaped members 15, 16 are mounted to the pallet 11 at the midpoints of its sides. The legs 17 may be secured to the pallet by any appropriate detachable connection. In this case, mounting brackets 45, 46 are used for this purpose, each having a flat transverse web portion 48 to which a corresponding leg may be welded. The web 48 presents a flat surface to the face of the deckboard or deckboards on which it is mounted, thus distributing the vertical load over an area greater than the diameter of the leg.

The two brackets 45 located in the middle of the deckboards 14 are provided with a pair of L-shaped flanges 49 on each side of the middle stringer 12 which extend downward from the web 48 and hook under the deckboard. To keep the bracket 45 from sliding away from its position embracing the deckboard 14 while straddling the stringer 12, a locking pin 50 is provided which is mounted to the leg 17 by a ring in such a manner that the pin may pass through a hole in the bracket 45 and deckboard 14. The brackets 46 on the other two legs 17 located at the ends of the central deckboards 14 are provided with an outside flange 51 mating against the end of the deckboards and also with a second flange, not shown, on the opposite side of the web 48 having a finger portion extending under the deckboard to secure the bracket from upward movement.

Another form of tiering frame 10a in which the interlock device of the present invention may be employed is shown in FIG. 11. The U-shaped members 15a, 16a with crossbars 18a, 19a, interlock device 20a, and interlock members 21a[,] *or* 22a, are similar to those described above. In this case, however, the legs 17a of the U-shaped members are mounted at the corners of the pallet 11a. The brackets 46a also are substantially similar to those used at the ends of the deckboards described above.

It should be appreciated that although the crossbars and legs have been described as being made from cylindrical tubing, rectangular tubing or other appropriate structural members could be used equally well.

I claim as my invention:

1. A pallet tiering frame comprising, in combination, a pair of support members each having two legs secured to the opposed ends of a crossbar *of tubular cross-section*, a first interlock member interposed at the center of the crossbar of one said support member *between two axially spaced sections thereof* and substantially in the same plane as said crossbar, said first interlock member being formed with a trough [having tapered side wall bearing surfaces] and a horizontal bearing surface approximately through the axis of said crossbar, a second interlock member interposed at the center of the crossbar of the second support member *between two axially spaced sections thereof* and substantially in the same plane as said crossbar, said second interlock member having a [tapered block therein defining bearing surfaces] *trough with a horizontal bearing surface therein* complementary to and adapted to readily engage the *trough and* bearing [surfaces] *surface* formed in said first interlock member so as to resist sliding movement therebetween *each said interlock member having means projecting into and engaging the crossbar sections associated therewith for establishing an exact positional relationship between said interlock member and crossbar section and providing a rigid overlap support at the joinder of said member and crossbar, and means rigidly securing each said interlock member to its respective associated crossbar sections.*

2. A pallet tiering frame comprising, in combination, two U-shaped members each having a pair of legs secured to a crossbar *of tubular cross-section,* a first interlock member interposed at the center of one said crossbar *between two axially spaced sections thereof* and in substantially the same plane as said crossbar, said first interlock member being formed with a tapered trough having *opposed inclined bearing surfaces and* a horizontal bearing surface approximately along the axis of said one crossbar, a second interlock member interposed at the center of the other of said crossbars *between two axially spaced sections thereof* and in substantially the same plane as said other crossbar, said second interlock member having [a block secured thereto defining] *opposed inclined bearing surfaces and* a horizontal bearing surface approximately along the axis of said other crossbar, said first and second interlock members being adapted to *interfit with said opposed inclined bearing surfaces in* [enter into] complemental engagement *and* with said horizontal bearing surfaces in substantially the common axial plane of said crossbars upon assembly of said frame on a pallet *each of said interlock members having a relatively heavy central portion terminating in a pair of axially spaced tapered hubs projecting into the respective crossbar sections associated therewith, and means rigidly joining said hubs to said crossbar sections.*

3. A pallet tiering frame comprising, in combination, a pair of support members each including a pair of legs and a connecting crossbar of tubular cross-section, means for detachably mounting said legs on a pallet, a pair of mating interlock members each interposed in a respective one of said crossbars between two axially spaced sections thereof, [one of] said interlock members *each* having a relatively heavy central portion straddled by a pair of axially spaced hubs, tapered end portions on said hubs projecting into the crossbar sections associated therewith, means rigidly joining said hubs to said associated crossbar sections, said central portion and said hubs defining a transverse trough in *each* said [one] interlock member, [the other] *the troughs* of said interlock members [having a longitudinally extending tapered block] *being* [therein] adapted to enter into complementary engagement with

[said trough] *each other upon mounting of said frame on a pallet.*

4. A pallet tiering frame comprising the combination of a pair of support members each including a pair of legs and a connecting crossbar, means for detachably mounting said legs on a pallet, a pair of mating interlock members each interposed in a respective one of said crossbars between two axially spaced sections thereof, [one of said interlock members being formed with a transverse trough having tapered side walls, the other of] said interlock members *each* being formed as a relatively heavy channel disposed transversely of its associated crossbar, means for rigidly joining the legs of said channel to said associated crossbar sections, [and] a tapered block *of generally U-shaped cross-section* fixed between the legs of *each* said channel and extending longitudinally of its associated crossbar, said [block being adapted to engage said trough complementally] *blocks each having a horizontal bearing surface approximately along the axis of its associated crossbar, and said horizontal block surfaces being adapted to enter into bearing engagement upon assembly of said frame on a pallet.*

5. A pallet tiering frame as defined in claim [3] *4,* wherein *each* said [other] interlock member comprises a relatively heavy channel with spaced apart legs, said channel being disposed transversely of its associated crossbar, means defining embossments projecting outwardly from said channel legs and spaced to fit within and locate the crossbar sections associated therewith, and means rigidly joining said channel legs to said associated crossbar sections associated therewith.

The following references cited by the Examiner, are of record in the patented file of this patent or the original patent.

References Cited

The following references cited by the Examiner, are of record in the patented file of this patent or the original patent.

UNITED STATES PATENTS

| | | | |
|---|---|---|---|
| 2,828,932 | 4/1958 | De Pew et al. | 108—55 |
| 2,942,826 | 6/1960 | De Pew et al. | 108—53 |
| 2,953,340 | 9/1960 | Skubic | 108—53 |
| 2,969,948 | 1/1961 | Higgins | 108—53 |
| 3,249,072 | 5/1966 | Skubic | 108—53 |
| 1,385,380 | 7/1921 | Lachman | 219—107 X |
| 2,194,272 | 3/1940 | Blu | 219—107 |

FOREIGN PATENTS

| | | |
|---|---|---|
| 1,239,012 | 7/1960 | France. |

BOBBY R. GAY, *Primary Examiner.*

G. O. FINCH, *Assistant Examiner.*